(12) United States Patent
Nellissen et al.

(10) Patent No.: US 6,226,170 B1
(45) Date of Patent: May 1, 2001

(54) THIN-FILM CAPACITOR

(75) Inventors: Antonius J. M. Nellissen, Eindhoven; Gerrit P. Van Der Beek; Willem R. De Wild, both of Roermond, all of (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/294,610

(22) Filed: Apr. 19, 1999

(30) Foreign Application Priority Data

Apr. 20, 1998 (EP) .................................................. 98201260

(51) Int. Cl.[7] .................................................. H01G 4/228
(52) U.S. Cl. .................................... 361/306.1; 361/306.1; 361/313; 361/302; 438/3; 438/254
(58) Field of Search .................................... 361/322, 313, 361/179, 272, 290, 292, 302, 283.3, 306.1, 321.2, 301.4; 438/393, 3

(56) References Cited

U.S. PATENT DOCUMENTS

| | | | |
|---|---|---|---|
| 4,453,199 | 6/1984 | Ritchie et al. | 361/306 |
| 5,347,423 * | 9/1994 | deNeuf et al. | 361/313 |
| 5,479,316 * | 12/1995 | Smrtic et al. | 361/322 |
| 5,736,448 * | 4/1998 | Saia et al. | 438/393 |
| 6,033,919 * | 3/2000 | Gnade et al. | 438/3 |
| 6,125,027 * | 9/2000 | Klee et al. | 361/320 |

* cited by examiner

*Primary Examiner*—Dean A. Reichard
*Assistant Examiner*—Nguyen Ha
(74) *Attorney, Agent, or Firm*—Norman N. Spain

(57) ABSTRACT

A thin-film capacitor comprises an electrically insulating substrate which is provided with at least two inner electrodes which are separated from each other by means of the dielectric layer. The capacitor also includes two end contacts which each electroconductively contact one of the inner electrodes. The electroconductive contact takes place via a through-connection which communicates exclusively with the main surface of the inner electrode. By virtue of this measure, it is achieved that the contact resistance between the end contacts and the inner electrodes is relatively low and reproducible. As a result, also the value of the ESR of the thin-film capacitor is low, so that the capacitor can very suitably be used for high-frequency applications.

6 Claims, 1 Drawing Sheet

THIN-FILM CAPACITOR

BACKGROUND OF THE INVENTION

The invention relates to a thin-film capacitor comprising an electrically insulating substrate which is provided with at least two inner electrodes which are separated from each other by means of a dielectric layer, and with two end contacts which each electroconductively contact one of the inner electrodes.

A thin-film capacitor of the type mentioned in the opening paragraph is known per se, for example from U.S. Pat. No. 4,453,199. Said patent document more particularly describes a thin-film capacitor which is provided with an electrically insulating substrate which is preferably made of glass. Said glass substrate is provided, by means of thin-film techniques, with successively a sub-layer of phosphor-doped silicon dioxide, a first inner electrode of aluminium, a dielectric layer of silicon dioxide, a second inner electrode of aluminium and an overlayer of silicon dioxide. The known capacitor is further provided with two sputtered end contacts. Via one of the ends, each of the inner electrodes electrically contacts one of the end contacts of the capacitor.

It has been found that the known thin-film capacitor has an important drawback. It has namely been found that in the case of mass-production of the known thin-film capacitor, the value of the contact resistance between the end contacts and the inner electrodes is relatively high. In addition, it has been found that this value is not the same for all capacitors manufactured in a single batch. This relatively high and variable value of the contact resistance may cause problems in high-frequency applications of this type of thin-film capacitor. Under said conditions, the contribution of the contact resistance to the ESR (electrical series resistance) becomes unacceptably high. The value of the ESR is determined by the resistance of the inner electrodes, the resistance of the end contacts and by the contact resistance between the inner electrodes and the end contacts.

SUMMARY OF THE INVENTION

It is an object of the invention to reduce this disadvantage. The invention more particularly aims at providing a thin-film capacitor in which the contact resistance between the inner electrode and the end contact is relatively low, so that the value of the ESR is also relatively low. In addition, the value of the contact resistance of each of the capacitors manufactured in a single batch should be substantially equal.

These and other objects of the invention are achieved by a thin-film capacitor of the type mentioned in the opening paragraph which is characterized in accordance with the invention in that the electroconductive contact takes place via a through-connection which is in communication exclusively with the main surface of the inner electrode.

The invention is also based on the recognition that the ends of the inner electrodes, which in the known capacitor make contact with the end contacts, are very sensitive to oxidation during the production process. This oxidation occurs, in particular, during the provision of the end contacts. As a result, the contact resistance between the inner electrodes and the end contacts becomes undesirably high and the value thereof varies uncontrollably, even if the thin-film capacitors are manufactured in a single batch.

By ensuring that the electric contact with the end contacts no longer takes place via the ends, but instead exclusively via the main surface of the inner electrodes, the problem of the relatively high and uncontrolled contact resistance is reduced substantially. In this construction, the through-connection communicates with the part of the end contact which extends substantially parallel to the substrate. It has been found that, as a result of the inventive measure, the ESR value of the capacitor in accordance with the invention is relatively low in comparison with that of the known capacitor.

A preferred embodiment of the invented thin-film capacitor is characterized in that the material of the through-connection is identical to the material of at least a part of the end contacts. This measure contributes substantially to the desired low contact resistance between the end contacts and the through-connection. An additional advantage of this measure is that the through-connection and a part of the end contacts can be provided simultaneously.

Another preferred embodiment of the thin-film capacitor in accordance with the invention is characterized in that the through-connection is channel-shaped, the longitudinal direction of the channel extending substantially parallel to the longitudinal direction of that end of the inner electrode with which the through-connection is in electric contact. By providing channel-shaped through-connections, a relatively large contact surface between the through-connection and the inner electrode is achieved. This has a favorable effect on the desirable low contact resistance between both parts of the capacitor. The channel-shaped through-connections preferably extend substantially as far as the side faces of the inner electrodes of the thin-film capacitor. If the channels extend as far as or beyond the side faces of the inner electrodes, problems may arise in the etch process of the channels during the manufacture of these capacitors.

Another favorable embodiment of the invented capacitor is characterized in that the capacitor also comprises one or more floating electrodes which do not electroconductively contact the end contacts. The advantageous effect of the low and controlled contact resistance between the end contact and the inner electrode is obtained also in this type of thin-film capacitor.

Yet another attractive embodiment of the invented thin-film capacitor is characterized in that the end contacts are U-shaped. Capacitors in accordance with this embodiment can be used as so-called SMD components. In such an embodiment, the through-connection is in communication with one of the two limbs of the U-shaped end contact.

Another interesting embodiment of the invented thin-film capacitor is characterized in that a layer of a polymer material is situated between one of the limbs of each of the U-shaped end contacts and the main surface of the substrate. By virtue of this layer, which preferably consists of polyimide, an improved mechanical strength of the end contacts is obtained. In this embodiment, the risk of fracture between the end contacts and the substrate is reduced if the capacitor is exposed to a mechanical load, such as vibrations.

DETAILED DESCRIPTION OF THE INVENTION

It is noted that, for clarity, the Figures are not drawn to scale.

Figure 1:
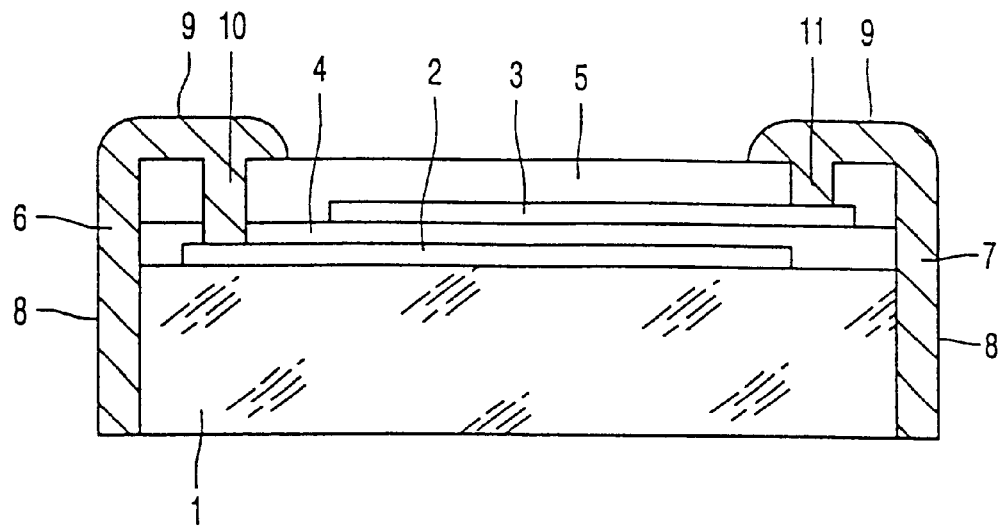
FIG. 1 is a diagrammatic, sectional view of a first embodiment of the invented thin-film capacitor.

FIG. 1 shows a first embodiment of the thin-film capacitor in accordance with the invention. This capacitor comprises an electrically insulating substrate (1), which is preferably made of an inorganic hard material. In the present case, use is made of a substrate of glass. The dimensions of this glass substrate are 1.6 mm by 0.8 mm by a thickness of 0.42 mm. Glass substrates have a relatively smooth surface. This is regarded as an important advantage in thin-film capacitors of the type under consideration. It is noted that ceramic substrates may alternatively be used, said ceramic substrates preferably being provided with a thin planarization layer, for which purpose, in particular, glass is very suitable.

On the substrate are situated a first inner electrode (2) and a second inner electrode (3) of an electroconductive material. In the present case, these electrodes are made of a layer of sputtered aluminum having a thickness in the range from approximately 2 to 4 micrometer. Said aluminum includes a few % by weight copper to preclude the development of so-called "hillocks". The electrodes are separated from each other by a layer (4) of a dielectric material, which in this case is made of silicon nitride. The layer is provided by means of plasma-enhanced physical vapor deposition (PE-CVD) and its thickness ranges between 0.3 and 2.5 micrometer. The first and second inner electrodes are covered with an electrically insulating overlayer (5). In the present case, this overlayer consists of a layer of silicon nitride having a thickness in the range between 0.5 and 2.5 micrometer. If necessary, the cover layer may be provided with a scratch-resistant polyimide layer (not shown).

Two opposed ends of the substrate are provided with two L-shaped end contacts (6) and (7). These end contacts consist, in the example shown, of a first layer of vapor-deposited Cr (layer thickness 1–100 nm) on which a second layer of vapor-deposited Cu (layer-thickness 200–500 nm) is provided. In the example shown, the end contacts consist of two parts. A first part (8) is situated at the side of the substrate and the capacitor part. A second part (9) extends substantially parallel to the substrate. As will be indicated hereinbelow, the parts (8) and (9) will, in the case before us, be provided via separate production steps.

The electroconductive contact between the inner electrodes (2) and (3) and the end contacts (6) and (7) is provided via the through-connections (10) and (11). Each of these through-connections communicates exclusively with the main surface of one of the inner electrodes at a location where the inner electrodes do not demonstrate an overlap. The through-connections may be circular in section (viewed parallel to the plane of the substrate). It is also possible to provide more than one through-connection per inner electrode.

Preferably, the through-connections are channel-shaped, the optimum width of the through-connections ranging from 100 to 150 micrometer. In the present case, the channels extend parallel to that side of the inner electrode that is closest to the end contact to which the inner electrode is connected. The length of the channels is at least half the width of the capacitor. Preferably, the channel-shaped through-connections extend substantially throughout the width of the surface of the inner electrode of the thin-film capacitor. The through-connections include an electroconductive material whose composition is preferably equal to that of the second part of the end contacts. In the present case, the composition includes Cr and Cu.

It is emphasized that the inner electrodes of the invented capacitors do not laterally contact the end contacts. The above-described thin-film capacitors in accordance with the invention are secured, for example soldered, to conductive tracks on a printed circuit board (PCB) via the second part (9) of the end contacts (6) and (7).

Figure 2:
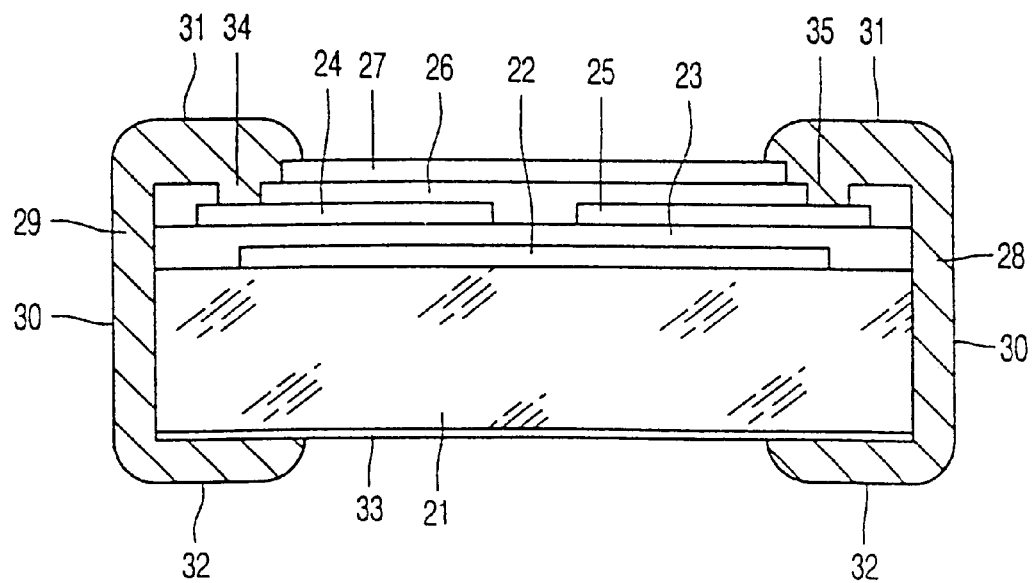
FIG. 2 is a diagrammatic, sectional view of a second embodiment of the invented thin-film capacitor.

FIG. 2 shows a second embodiment of the thin-layer film capacitor in accordance with the invention. This capacitor comprises an electrically insulating substrate (21), which is preferably made of an inorganic hard material. Also in the present case, a substrate made of glass is used. The dimensions of the substrate are 0.8 mm by 1.6 mm by a thickness of 0.42 mm.

A so-called floating electrode (22) of an electroconductive material is situated on a main surface of the substrate (21). In the embodiment shown, this electrode consists of a layer of sputtered aluminium (comprising 4% by weight copper), having a thickness ranging between 2 and 4 micrometer. The floating electrode (22) is provided with a layer (23) of a dielectric material which, in this case, consists predominantly of doped or undoped silicon nitride. This layer is provided by means of PE-CVD in a thickness ranging between 0.3 and 2.5 micrometer.

Two other inner electrodes (24) and (25) are provided on the dielectric layer (23). These inner electrodes also consist of aluminum containing 4% by weight copper. The thickness of the layers ranges between 2 and 4 micrometer. The electrodes (24) and (25) are largely covered with a layer (26) which, in the present case, consists of a layer of silicon nitride having a thickness in the range between 0.5 and 2.5 micrometer). The layer (26) is provided with a scratch-resistant layer (27) of polyimide having a thickness in the range between 5 and 30 micrometer.

At two opposed ends of the substrate, two U-shaped end contacts (28) and (29) are provided. In the example shown, these end contacts consist of a first layer of vapor-deposited Cr (layer thickness 1–100 nm) on which a second layer of Cu (layer thickness 200–500 nm) is vapor-deposited. In the example shown, the end contacts consist of three parts. The first part (30) is situated at the side of the substrate and the capacitor part. The two other parts (31) and (32) extend substantially parallel to the substrate. As will be indicated hereinbelow, in the present case, these three parts are provided by means of separate production steps.

A thin layer (33) (layer thickness 5–30 micrometer) of a polymer material is situated between part (32) of the end contact and the main surface of the substrate facing away from the capacitor structure. In the example shown, this layer extends throughout the surface of the substrate. To achieve the mechanically strengthening effect of the layer, it is sufficient, however, if the layer is present only at the location of the limbs of the U-shaped end contacts. In the present case, this layer consists predominantly of polyimide.

The electroconductive contact between the inner electrodes (24) and (25) and the end contacts (28) and (29) takes place via the through-connections (34) and (35). Each of these through-connections communicates exclusively with the main surface of one of the inner electrodes. The through-connections may be circular in section (viewed parallel to the surface of the substrate). It is alternatively possible to provide more than one through-connection per inner electrode.

Preferably, the through-connections are channel-shaped, said through-connections having an optimum width in the range from 100–150 micrometer. The length of the channels is at least half of the width of the capacitor. Preferably, the channel-shaped through-connections extend substantially throughout the width of the surface of the thin-film capacitor. The through-connections comprise an electroconductive material, the composition of which is preferably equal to that of the second part of the end contacts. In the present case, the composition includes Cr and Cu.

It is emphasized that the inner electrodes (24) and (25) of the invented capacitors do not laterally contact the end contacts (28) and (29). The thin-film capacitors described hereinabove can be secured to conductive tracks on a printed circuit board (PCB), for example by soldering, via the second part (31) or the third part (32) of the end contacts.

Both above-described examples of the invented capacitor can be mass-produced in the following manner. For the starting material use is made of a 4 inch (square) or a 6 inch (round) wafer of glass having a thickness of 0.42 mm. After cleaning (ultrasonic treatment carried out successively in a solution of soap and an acid solution), this wafer is provided, on a first main surface, with a pattern of (inner or floating) electrodes of aluminium by means of sputter deposition and lithography. This pattern of electrodes is subsequently provided with a thin layer of silicon nitride by means of plasma-enhanced CVD.

A pattern of inner electrodes is subsequently applied to this layer by means of sputter deposition and lithography. Subsequently, a layer of silicon nitride is provided on this pattern of electrodes. If necessary, a thin layer of polyimide is applied, for example by means of spin-coating, to the layer of silicon nitride. If necessary, the other main surface may also be provided with a thin layer of a polymer material, such as polyimide.

The resultant layer structure is provided with holes for the through-connections by means of reactive ion etching, said holes extending down to the main surface of the inner electrodes. Said holes may be channel-shaped or round. Subsequently, a part of the end contacts is provided in accordance with a pattern by successively sputtering or vapor-depositing Cr and Cu. In this sputter or vapor-deposition process, the through-connections are simultaneously filled with said metals. If U-shaped contacts are desired, also the second main surface of the substrate is similarly provided, in accordance with a pattern, with a part of the end contacts. These end contacts are provided directly onto the glass or instead onto the layer of a polymer material.

Subsequently, the wafers are separated into strips (for example by means of cutting). The fracture faces of the strips are provided with an electroconductive material (for example vapor-deposited or sputtered Cu and Cr), thereby forming the complete end contacts. If necessary, the end contacts are strengthened by means of electroplating processes in which successively a layer of Cu (approximately 2 micrometer), Ni (approximately 1 micrometer) and Sn (approximately 5 micrometer) are grown on the end contacts. Finally, the strips are separated (for example by means of cutting) so as to form individual thin-film capacitors. It is noted that strengthening of the end contacts by means of electroplating may also take place, if necessary, at the individual thin-film capacitors.

The present invention provides a novel and inventive type of thin-film capacitor, in which the contact resistance between the inner electrodes and the end contacts is relatively low. This is achieved by making electric contact with the end contacts exclusively via the main surface of the inner electrode instead of via the ends of the inner electrodes. As a result, the problem of the relatively high and uncontrolled contact resistance is reduced considerably and the value of the ESR is relatively low.

What is claimed is:

1. A thin-film capacitor comprising an electrically insulating substrate which is provided with at least two inner electrodes which are separated from each other by means of a dielectric layer, each of said inner electrodes having a main surface, and with two end contacts provided at opposite sides of said capacitor and each of which contacts electroconductively contacts one of the inner electrodes, characterized in that the electroconductive contact takes place via a through-connection which is in communication with the inner electrode exclusively at its main surface.

2. A thin-film capacitor as claimed in claim 1, characterized in that the through-connection is channel-shaped, the longitudinal direction of the channel extending substantially parallel to the longitudinal direction of that said end contact of the inner electrode with which the through-connection is in electric contact.

3. A thin-film capacitor as claimed in claim 1, characterized in that the capacitor also comprises one or more floating electrodes which do not electroconductively contact the end contacts.

4. A thin-film capacitor as claimed in claim 1, characterized in that the end contacts are U-shaped.

5. A thin-film capacitor as claimed in claim 4, characterized in that a layer of a polymer material is situated between one limb of each of the U-shaped end contacts and the main surface of the substrate.

6. A thin film as claimed in claim 1, characterized in that the through-connection and at least a part of the end contacts are of identical materials.

* * * * *